United States Patent [19]

Emo

[11] Patent Number: 5,408,367
[45] Date of Patent: Apr. 18, 1995

[54] METHOD OF OPTIMIZING OPERATION OF DISK DRIVE

[75] Inventor: Bruce D. Emo, Niwot, Colo.

[73] Assignee: Integral Peripherals, Inc., Boulder, Colo.

[21] Appl. No.: 124,322

[22] Filed: Sep. 20, 1993

[51] Int. Cl.⁶ .................... G11B 5/09; G11B 5/596
[52] U.S. Cl. .................... 360/53; 360/77.05
[58] Field of Search .......... 360/53, 51, 48, 77.01, 360/77, 77.04, 77.06, 77.05

[56] References Cited

U.S. PATENT DOCUMENTS

| | | | |
|---|---|---|---|
| 3,959,820 | 5/1976 | Braun | 360/77.05 |
| 4,620,243 | 10/1986 | Bakker et al. | 360/77.05 |
| 4,697,213 | 9/1987 | Kitamura | 360/77.04 |
| 4,821,125 | 4/1989 | Christensen et al. | 360/31 |
| 4,878,135 | 10/1989 | Makino et al. | 360/77.04 X |
| 4,907,109 | 3/1990 | Senio | 360/77.04 X |
| 4,908,561 | 3/1990 | Hashimoto | 360/77.06 X |
| 4,933,939 | 6/1990 | Kendall et al. | 371/5.5 |
| 5,065,263 | 11/1991 | Yoshida et al. | 360/77.04 |
| 5,105,318 | 4/1992 | Tsuneta et al. | 360/77.04 X |
| 5,135,681 | 2/1993 | Volz et al. | 360/77.04 X |
| 5,210,662 | 5/1993 | Nishijima | 360/77.04 |
| 5,258,876 | 11/1993 | Danner et al. | 360/45 |
| 5,270,885 | 12/1993 | Satoh et al. | 360/77.04 |

Primary Examiner—Donald Hajec
Assistant Examiner—Le Thien Minh
Attorney, Agent, or Firm—Skjerven, Morrill, MacPherson, Franklin & Friel; Paul J. Winters

[57] ABSTRACT

A method for individually evaluating a head and disk combination to selectively optimize and calibrate the read and write systems thereof in a short time is achieved by deliberately positioning the head off the track center-line by introducing known offset into the track position servo system. This results in reducing the data signal strength proportional to the offset while noise remains at a relatively constant level, thereby reducing the signal to noise ratio and increasing the error rate in a systematic way.

7 Claims, 4 Drawing Sheets

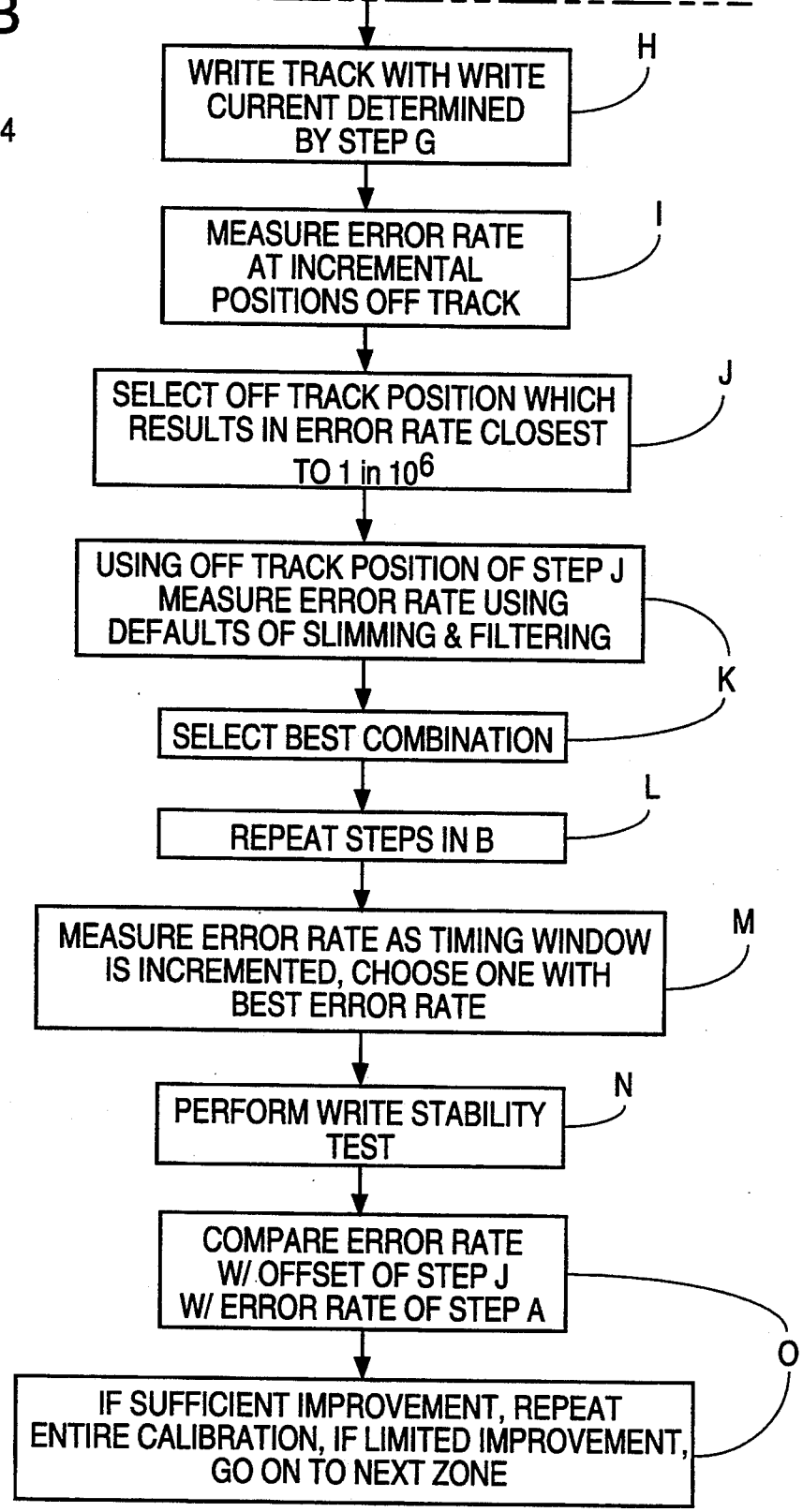

METHOD OF OPTIMIZING OPERATION OF DISK DRIVE

FIELD OF THE INVENTION

This invention relates to disk drive systems, and more particularly, to a method for optimizing the operation of such a system.

BACKGROUND OF THE INVENTION

It will be understood that disk drive magnetic storage devices must write and read information with very low error rates. The primary components of a disk drive system which determine the signal to noise ratio, which in turn determines the error rate, are the magnetic head and the disk recording medium.

In the prior art, considerable testing is done on each of these components in an attempt to assure that the combination thereof will work at an acceptably low error rate. Because these components interact in complex ways, this screening of individual elements can unnecessarily eliminate some combinations of components which might work successfully together, thus needlessly increasing the cost of the disk drive. Furthermore, in disk drives using bands of different recording density, individual component testing becomes prohibitably complex and expensive.

A second type of problem is that with high volume manufacturing, adjustment to optimize performance of individual devices may be undesirable, and indeed, with miniature disk drives it may be physically impossible to incorporate such adjustments due to the small size of the equipment.

A third problem is that as components age, the error performance may deteriorate. Disk drives are typically embedded in a compact computer unit, so that service and adjustment thereto are not practical or cost effective.

U.S. Pat. No. 5,121,262 to Squires et al. partially addresses the first-mentioned problem above by providing a method that adjusts certain parameters and fixes a single set of adjustments. A serious problem with this method is that no means are described to optimize each recording zone, nor is the adjustment available during normal operation of the system.

A further problem with such a method is that the normal error rate is so low that a very long time is required to measure the errors and analyze the effect of any adjustment to the system. For example, a typical disk drive with 160,000 data bits per track having an error rate of one bit in $10^8$ will produce a single error on the average of once every ten seconds. If ten samples are required for statistical reliability, a disk drive with four adjustment routines each with eight steps would require nearly 53 minutes per disk surface. If this optimization were required for multiple-zone recording for a disk drive with more than a single recording surface, it is evident that the method could take several hours, which would be impractical for calibration except at the point of manufacture.

U.S. Pat. No. 5,053,892 to Supino et al. discloses a method of disk drive operation wherein the head position may be adjusted in an attempt to improve its centering over the track of data. The method further discloses attempting to change the domain configuration (and thus the permeability of the head poles) to enable the head to improve its reading operation. Rather than a methodical approach to improving the operation of the system, this patent discloses a method wherein after a certain number of failed attempts are undertaken, the device is declared uncorrectable.

SUMMARY OF THE INVENTION

It is accordingly an object of this invention to provide a method for individually evaluating each head and disk combination and to selectively optimize and calibrate the read and write system thereof for each recording band. Furthermore, this optimization takes place in a sufficiently short amount of time so that calibration can take place during operation.

This is accomplished by deliberately positioning the head off the track center-line by introducing known offset into the track position servo system. This results in reducing the data signal strength proportional to the offset while noise remains at a relatively constant level (or does not increase to a great extent), thereby reducing the signal to noise ratio in a systematic way.

The particular methods steps undertaken which incorporate the above method of systematically increasing error rate are described below.

Thus, a general purpose of the present invention is to provide a method to obtain the optimum performance from the disk drive system, through a systematic method which can be applied to the combination of head and disk.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
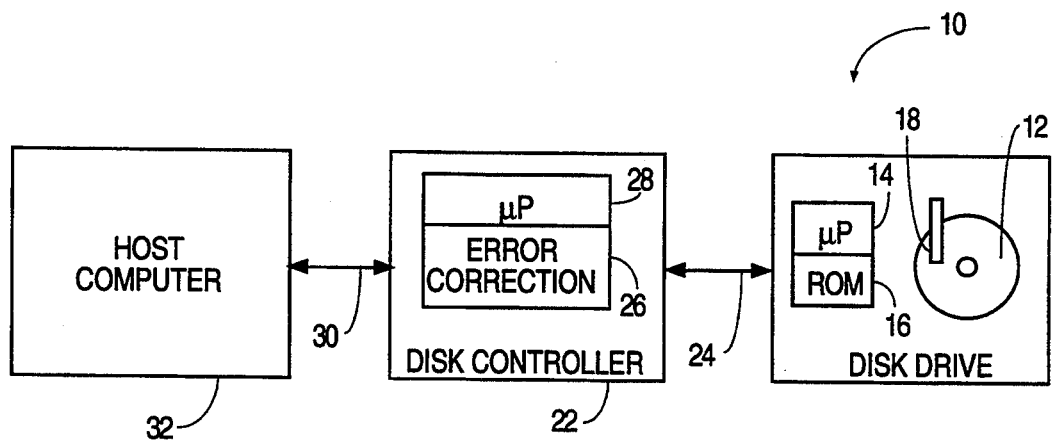
FIG. 1 is a block diagram of a host computer and a disk storage system.

Referring to FIG. 1, a disk drive unit 10 includes at least one rotating magnetic disk 12. A microprocessor 14 and read-only-memory 16 control the operation of a read/write head assembly 18 to in turn cause it to read and write bits of data in a track 20 (of a plurality thereof) on the magnetic disk 12 in response to instructions from a disk controller 22 provided through link 24. Link 24 also carries bits back and forth between the disk controller 22 and disk drive 10, and carries status information from the disk drive 10 back to the disk controller 22.

The disk controller 22 includes error correction circuitry 26 which implements an appropriate error correction code with respect to bits being sent to the disk drive 10 for storage and with respect to possible corruptive bit sequences read from the disk 12. A microprocessor 28 governs the delivery and receipt of bits, instructions and status information by link 24 and also communicates by a link 30 with a host computer 32.

Figure 2:
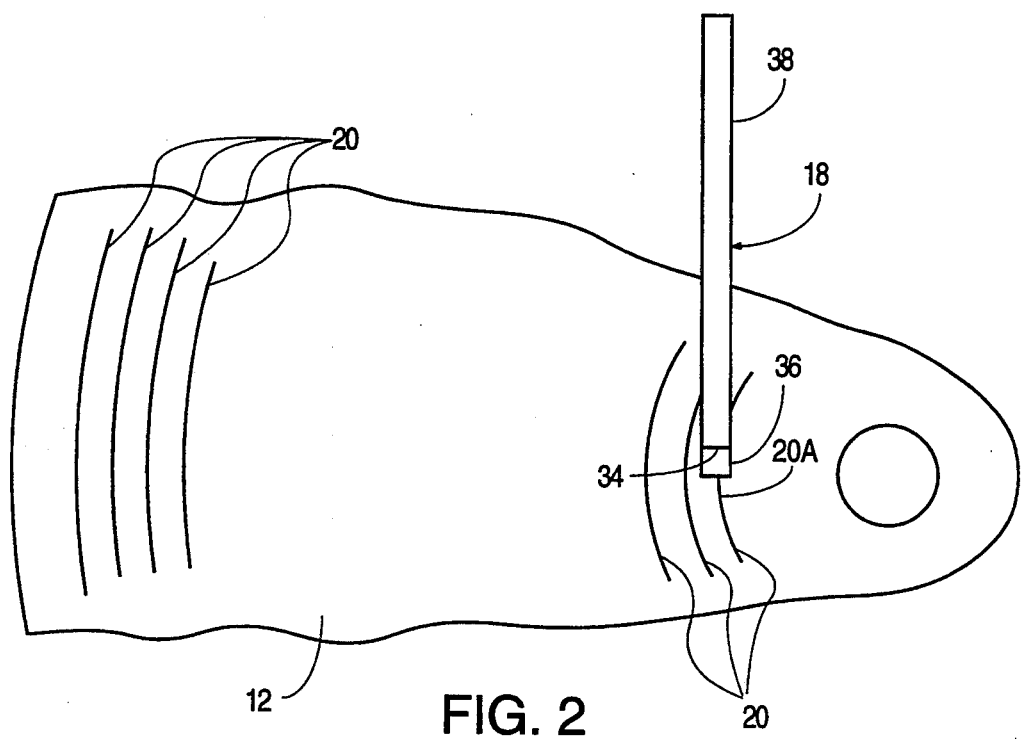
FIG. 2 is a diagrammatic top view of a portion of a magnetic disk.

Referring to FIG. 2, each surface of a magnetic disk 12 is organized in concentric tracks 20. Near the center of the disk 12 is an inner track 20A which may normally be a maintenance/diagnostic track. The disk 12 may of course include a plurality of zones, each of which has its own inner diagnostic/maintenance track.

The read/write head assembly 18 includes at least one head 34, which may be composite, laminated or ferrite, mounted on a slider 36 which is supported on an arm 38 as shown. The slider 36 moves above the disk with the poles of the head 34 positioned to read or write on a desired track.

Figure 4A:
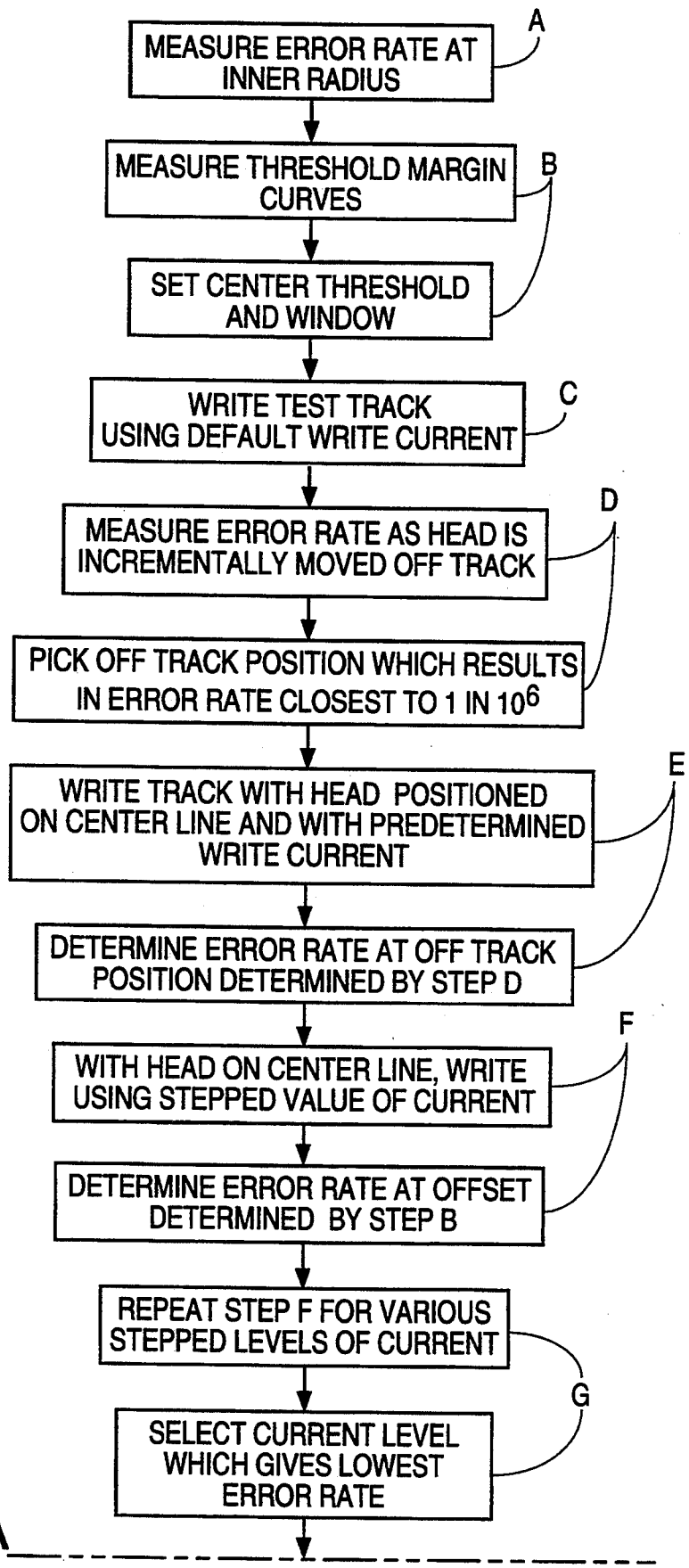
FIG. 4, consisting of FIGS. 4A and 4B, is a flow chart of a procedure for optimizing operation of the disk drive system.

The method for optimizing operation of the disk drive system is now described, with reference to FIG. 4.

(A) Initially, the error rate at the maintenance/diagnostic track 20A at the inner radius is measured, i.e., this maintenance/diagnostic track 20A has data written therein (referred to as a "track of data" or a "data track"), and during the read operation, the error rate is determined. If the error rate is greater than a predetermined level, for example, more than one error in $10^8$ bits, the following steps are undertaken.

Figure 3:
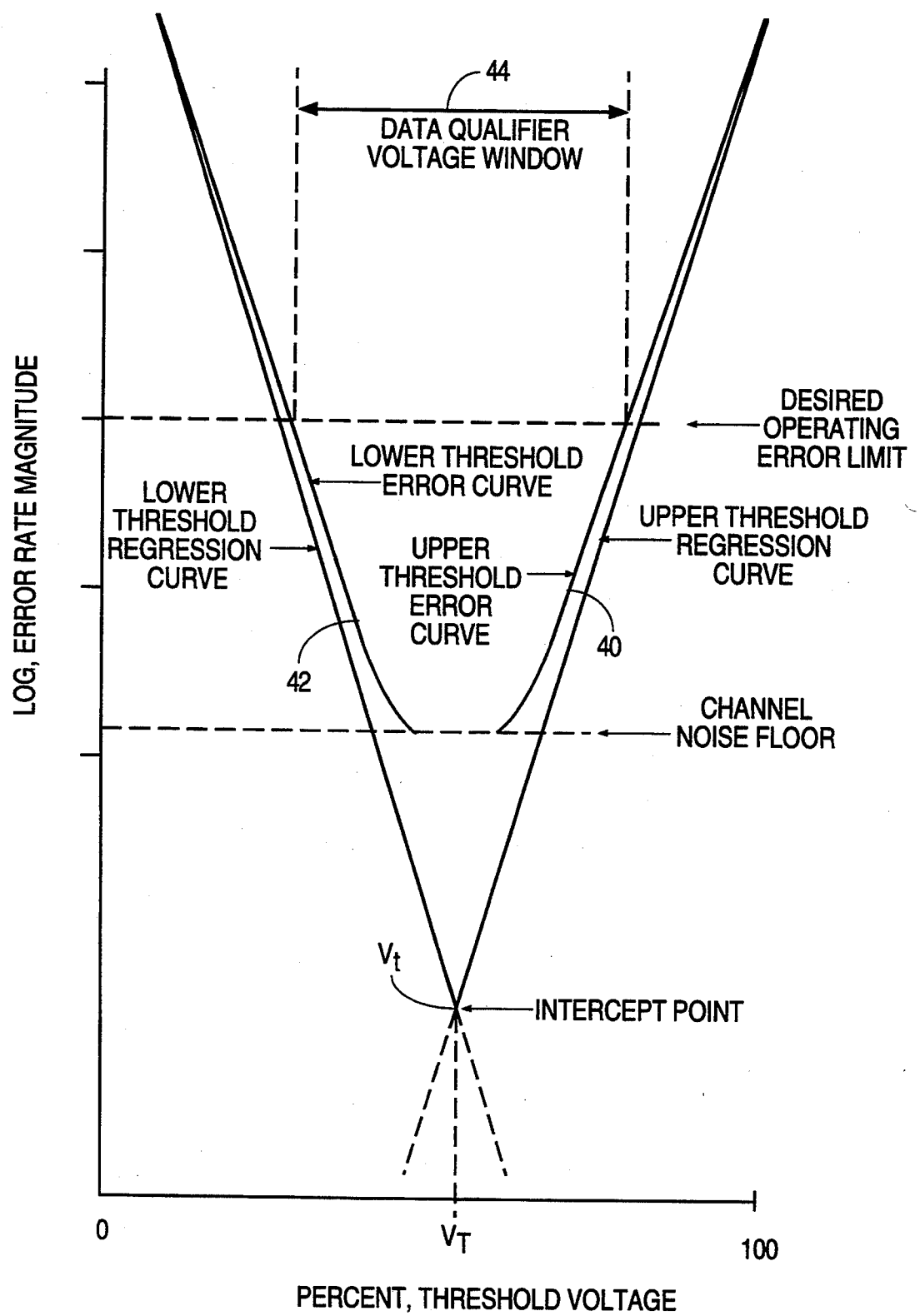
FIG. 3 is a graph representing adjustments to the upper and lower data qualifier voltage thresholds of the system.

(B) The system 10 as provided includes an upper data qualifier voltage threshold, and a lower data qualifier voltage threshold, which are set at default values. The upper data qualifier voltage threshold is incremented, and the error rates as measured with each such upper data qualifier voltage threshold are recorded. Likewise, the lower data qualifier voltage threshold is incremented, and the error rates as measured with each such data qualifier voltage threshold are recorded. The curves defined thereby are shown in FIG. 3 at 40 and 42, using mathematical regression analysis on this data, the intercepts of the upper and lower threshold curves are determined. This value is the qualifier operating voltage $V_t$. The qualifier upper and lower voltage window 44 is determined and centered about voltage $V_t$ and stored.

(C) A data test track on the maintenance/diagnostic track 20A is written, using the default value of the write current of the system.

(D) The error rate is measured as the head 34 is incrementally positioned at progressively larger off-track distances in one direction. A table of error rate information is created. The off track position which results in an error rate closest to one in $10^6$ is selected and stored.

(E) Next, with the head 34 positioned on the track 20A center-line, the track 20 is written with a predetermined value of write current. The error rate is then determined which occurs at the off-track position determined in step (D).

(F) Then, another data track is written using a stepped value of write current with the head 34 again positioned on the track 20A center-line. Again, an error rate is determined which occurs at the off track position determined in step (D).

(G) Step (F) is repeated several times with different values of write current, and the value of the write current which gives the lowest error rate is selected and stored.

(H) The track is then written with the value of write current determined in step (G).

(I) Subsequent to step (H), the error rate is measured as the head 34 is incrementally positioned at progressively larger off-track distances in one direction, similar to the above. A table of such error rate information is created.

(J) The off track position which results in an error rate closest to one in $10^6$ is chosen and stored.

(K) Using this new off-track position determined in step (J), the error rate is measured using the default combination of slimming and filtering settings of the system. A matrix of slimming and filtering settings is determined, and the error rates are determined using the values of the slimming and filtering settings surrounding the default combination. From this matrix, the combination of slimming and filtering with the lowest error rate is selected, and all combinations of the matrix surrounding the optimum (lowest error rate) have been measured, so that the best combination (lowest error rate) may be saved. An alternative preferred method for achieving this result is disclosed in the text "Factorial Experiment Design, Fundamental Concepts in the Design of Experiments," authored by Charles R. Hicks, published 1982 by Holt, Reinehart, Winston, at pages 164–207.

(L) Steps (B) set forth above is repeated to arrive at a new qualifier operating voltage, and a new qualifier upper and lower voltage window is determined and centered about this new qualifier voltage, and stored.

(M) The error rate is measured as the data detection timing window (strobe) is incremented, evaluating both early and late window timing values. A table of values is then created, and the strobe value with the lowest error rate is placed in memory.

(N) A write stability test is performed in an unused sector, and the signal is tested for non-repeatability. If a failure occurs, the drive must be considered defective.

(O) The off-track error rate is measured using the value of track offset determined from step (J). The error rate determined in this test is compared with the initial error rate determined on step (A). If the improvement exceeds a factor of ten, the entire calibration test is repeated. If the improvement is less than a factor of ten, it is concluded that the testing of this zone is sufficient, and testing can then be undertaken on the next head/zone combination.

In this testing sequence, it will be seen that the error rate is chosen to be as high as possible to minimize error rate measurement time while the measurement behaves in a stable predictable manner. It has been determined experimentally that an error rate of one in $10^6$ bits provides satisfactory operation.

In accordance with the above description, it will be seen that the disk drive itself becomes the test equipment and the actual channel electronics can be specifically optimized. Using the actual error rate of the disk drive results in realistic measurements allowing better optimization than can be obtained with methods that merely address fixed timing-window parameters.

Thus, it will be seen that by systematically increasing the error rate by offsetting the head in relation to the track, so as to decrease the signal to noise ratio, a rapid an accurate evaluation of the system can be made, so that appropriate adjustments to the system for improving performance can be made in a relatively short time, dealing with the specific combination of disk and head.

I claim:

1. A method of testing a disk drive apparatus including a disk and a head, comprising:
    positioning the head in a first position relative to a track of data on the disk;
    measuring the error rate of the track of data with the head in said first position relative to the track;
    positioning the head in a second position relative to the track of data so that an error ate higher than said first-mentioned error rate will be read;

measuring the error rate of said track of data with the head in said second position relative to the track;

writing data in the track with a first level of write current with the head in the first position relative to the track, and measuring, with the head in the second position relative to the track, the error rate of the track of data so written by the first level of write current, writing data in the track with a second level of write current with the head in the first position relative to the track, and measuring, with the head in the second position relative to the track, the error rate of the track of data so written by the second level of write current.

2. A method of testing a disk drive apparatus including a disk and a head, comprising:

positioning the head in a first position relative to a track of data on the disk;

measuring the error rate of the track of data with the head in said first position relative to the track;

positioning the head in a second position relative to the track of data so that an error rate higher than said first-mentioned error rate will be read;

measuring the error rate of said track of data with the head in said second position relative to the track;

choosing a position of the head relative to the track of data which generally correlates with a chosen error rate;

writing data in the track with a first level of write current with the head in the first position relative to the track, and measuring, with the head in the chosen position relative to the track, the error rate of the track of data so written by the first level of write current, writing data in the track with a second level of write current with the head in the first position relative to the track, and measuring, with the head in the chosen position relative to the track, the error rate of the track of data so written by the second level of write current.

3. The method of claim 1 and further comprising adjusting the upper and lower data qualifier voltage thresholds of the apparatus.

4. The method of claim 1 and further comprising adjusting the slimming and/or filtering settings of the disk drive apparatus.

5. The method of claim 2 and further comprising the step of writing data in the track using the level of write current determined by a particular error rate.

6. The method of claim 5 and further comprising, subsequent to said step of writing data in the track using the level of write current determined by a particular error rate:

positioning the head in one position relative to said track of data on the disk;

measuring, with the head in said one position relative to the track, the error rate of the track of data so written by the level of write current determined by the particular error rate;

positioning the head in another position relative to the track of data so written by the level of write current determined by the particular error rate so that an error rate higher than said first-mentioned error rate will be read;

measuring, with the head in said another position relative to the track, the error rate of said track of data so written by the level of write current determined by the particular error rate.

7. The method of claim 6 and further comprising the steps of:

positioning the head in yet another position relative to the track of data so written by the level of write current determined by the particular error rate so that yet another error rate will be read;

measuring, with the head in said yet another position relative to the track, the error rate of said track of data so written by the level of write current determined by the particular error rate; and choosing a position of the head relative to the track of data so written by the level of write current determined by the particular error rate which generally correlates with a chosen error rate.

* * * * *

UNITED STATES PATENT AND TRADEMARK OFFICE
CERTIFICATE OF CORRECTION

PATENT NO.   :   5,408,367
DATED        :   April 18, 1995
INVENTOR(S)  :   Bruce D. Emo It is certified that error appears in the above-identified patent and that said Letters Patent is hereby corrected as shown below:

Col. 4, line 67, delete "ate" and insert --rate--.

Signed and Sealed this

Nineteenth Day of September, 1995

Attest:

BRUCE LEHMAN

*Attesting Officer*    *Commissioner of Patents and Trademarks*